Figure 3:
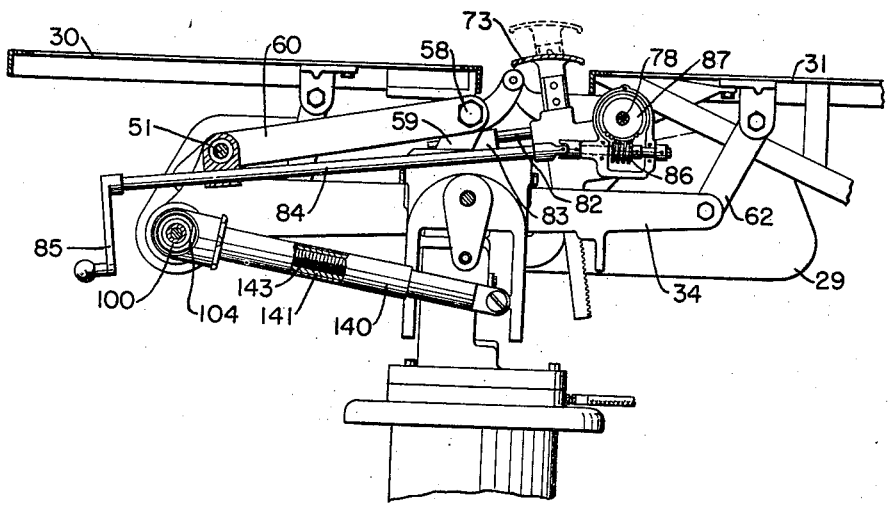

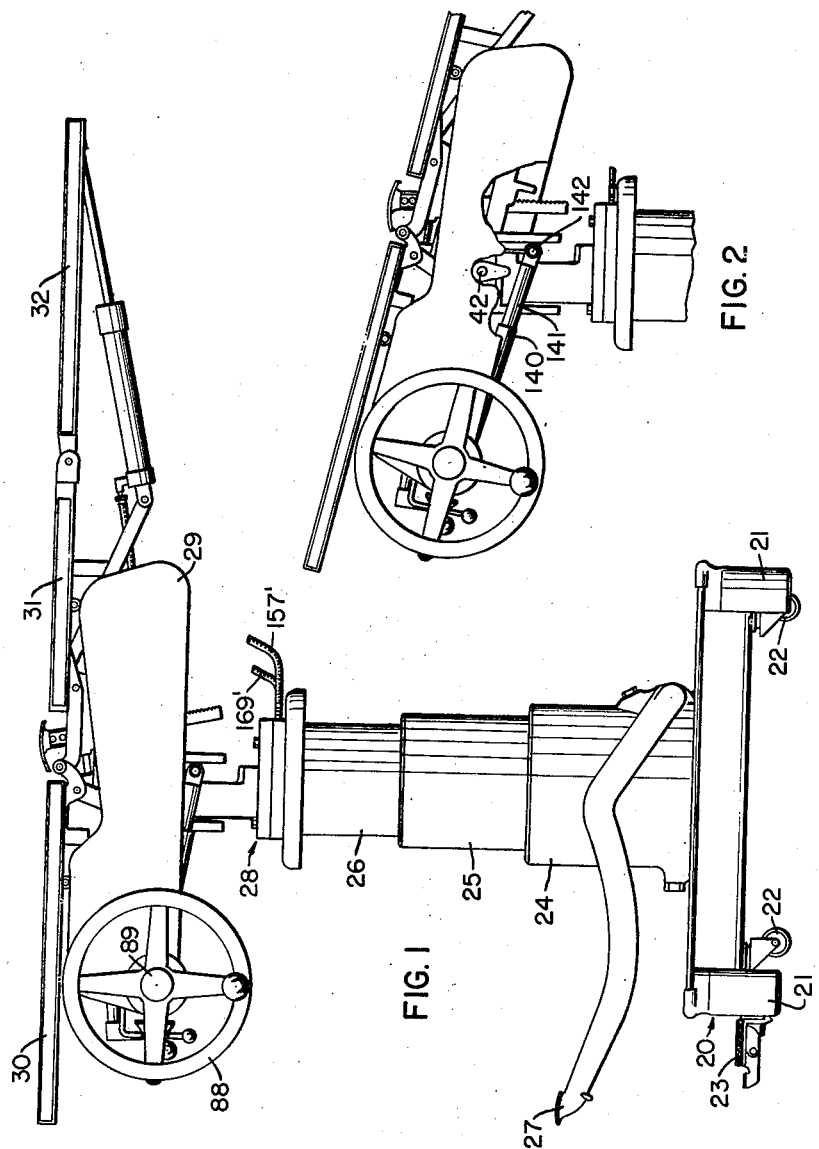

Jan. 25, 1955 R. P. DAVIS ET AL 2,700,583
OPERATING TABLE WITH SELECTIVE CONTROL MECHANISM
Filed June 18, 1949 6 Sheets-Sheet 2

INVENTORS
ROBERT P. DAVIS
JOHN PHILIPPI
BY
Pennie, Edmonds, Morton & Barrows
ATTORNEYS Jan. 25, 1955　　　R. P. DAVIS ET AL　　　2,700,583
OPERATING TABLE WITH SELECTIVE CONTROL MECHANISM
Filed June 18, 1949　　　　　　　　　　　　　　6 Sheets-Sheet 3
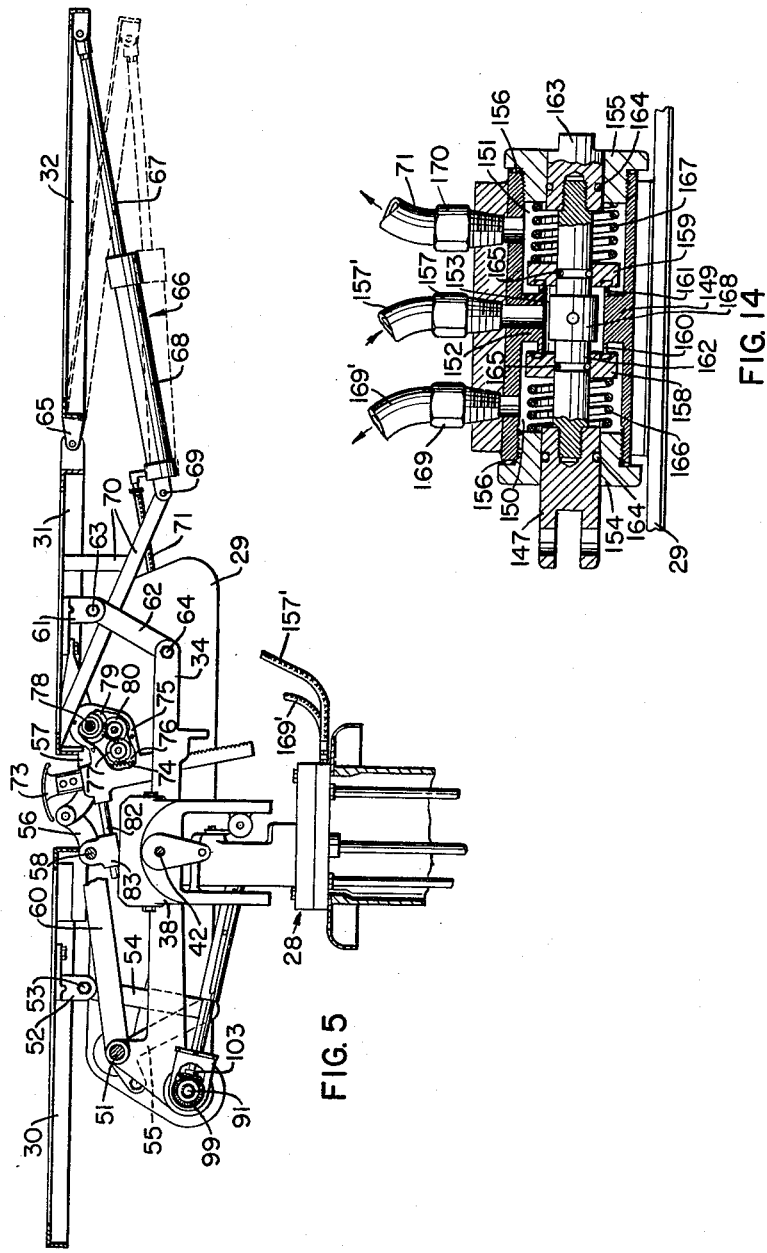
INVENTORS
ROBERT P. DAVIS
JOHN PHILIPPI
BY
Pennie, Edmonds, Morton & Barrows
ATTORNEYS

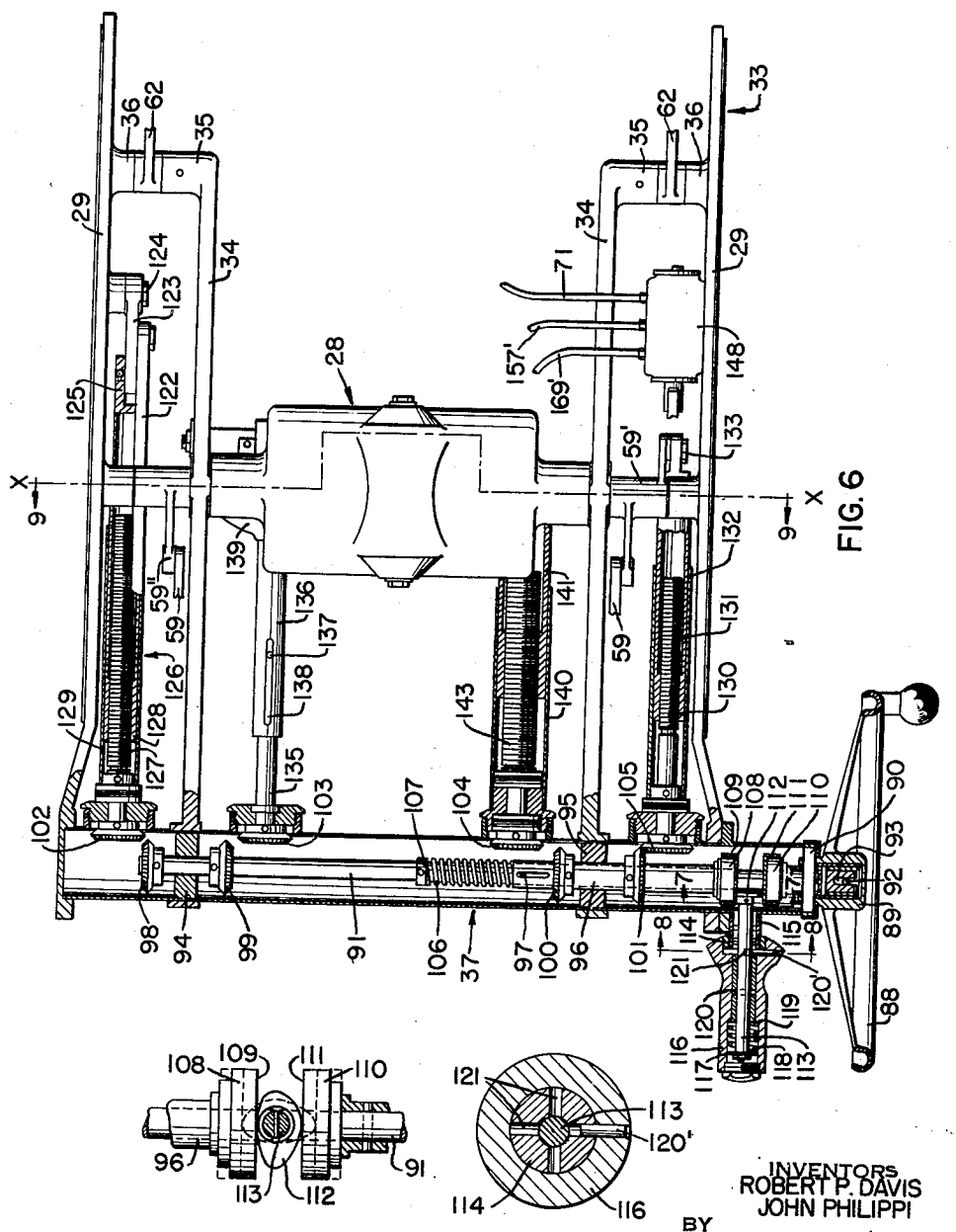

Jan. 25, 1955 R. P. DAVIS ET AL 2,700,583
OPERATING TABLE WITH SELECTIVE CONTROL MECHANISM
Filed June 18, 1949 6 Sheets-Sheet 5

INVENTORS
ROBERT P. DAVIS
JOHN PHILIPPI
BY
Pennie, Edmonds, Morton & Barrows
ATTORNEYS

INVENTORS
ROBERT P. DAVIS
JOHN PHILIPPI
BY
ATTORNEYS

United States Patent Office 2,700,583
Patented Jan. 25, 1955

2,700,583

OPERATING TABLE WITH SELECTIVE CONTROL MECHANISM

Robert P. Davis, Elizabeth, N. J., and John Philippi, Madison, Wis., assignors to Air Reduction Company, Incorporated, a corporation of New York Application June 18, 1949, Serial No. 99,944

4 Claims. (Cl. 311—7)

This invention relates to surgical operating tables.

While the primary purpose of a surgical operating table is to provide a firm table surface upon which a patient may be supported during an operation, it is frequently desirable to change the position of a patient so supported, this being accomplished by changing the position of the table surface. Modern surgery today is involved with many very delicate and complex operations requiring highly specialized positioning of the patients upon whom they are to be performed and, therefore, an operating table to be satisfactory for supporting patients for these operations must possess extreme flexibility of adjustment.

Many operating tables do not possess the degree of flexibility required and cannot provide for a sufficient number of different positions. Others, while capable of being fixed in or adjusted to the required position, necessitate a great many troublesome adjustments which often interfere with the procedure and performance of the operation. Almost without exception, such tables have adjustment controls for altering the position of the table and its parts, located on and around the table at points remote from one another so that any change in the position of the table or arrangement of its parts necessitates a great deal of maneuvering on the part of the operator. This, of course, is objectionable and highly undesirable because most operations must be carried out smoothly and with the utmost precision and without any delay or interference.

Adjustments of an operating table during an operation are nearly always made by the anesthetist. His primary concern however must be the observance and control of the patient's physical condition at all times, during an operation, and the role of adjusting the operating table should therefore be made as simple for him as possible. He should always maintain physical contact with the patient throughout the operation to preclude the possibility of a discharge of static electricity within the area where the air contains highly explosive anesthetic gas vapors. Such contact is usually maintained with the left hand and the anesthetist normally assumes a position slightly to the right at the head end of the table. It is apparent, therefore, that the more the controls can be grouped together in a small area at the head end of the table and preferably within easy reach of the anesthetist's or operator's right hand, the more favorable does the table lend itself to easy adjustment.

It is therefore the main object of this invention to provide a surgical operating table in which all operating control members are located in a particular area so that the operator may control movements of the table from one position.

It is also an object of this invention to provide a surgical operating table which may be adjusted to different operating positions with minimum effort on the part of the operator.

Additionally it is an object of this invention to provide an operating table of improved design which will incorporate many desirable features in a compact and simple construction.

Accordingly, the invention broadly contemplates an operating table having a simplified control system, the controls of which are so located that they enable the operator to manipulate them, and thereby the various working parts of the table, from a single position at the head end of the table. One of the primary features of the control system is a selective gear transmission through which the various working parts for the table elements are actuated. The transmission includes a plurality of pairs of gears mounted on coaxial shafts, each gear having a corresponding gear associated with the working parts for one of the table elements. The coaxial shafts are relatively movable axially of one another by means of a cam whose contour is such that the shafts may be moved to any of a number of positions in which a gear carried by one of the shafts engages its corresponding gear associated with the working parts for one of the table elements. In addition, the table includes a fluid control valve possessing special features that adapt it to the special arrangement of the table control mechanism.

Figure 4:
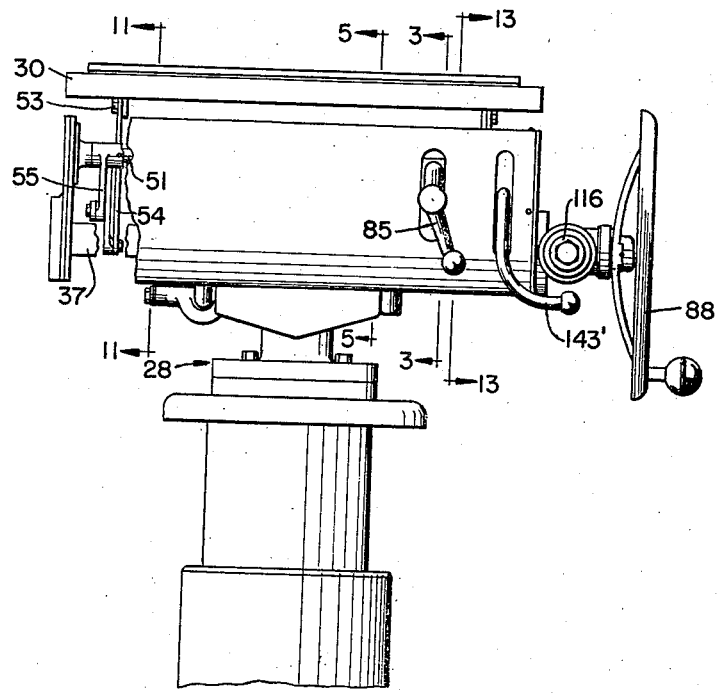
Figure 9:
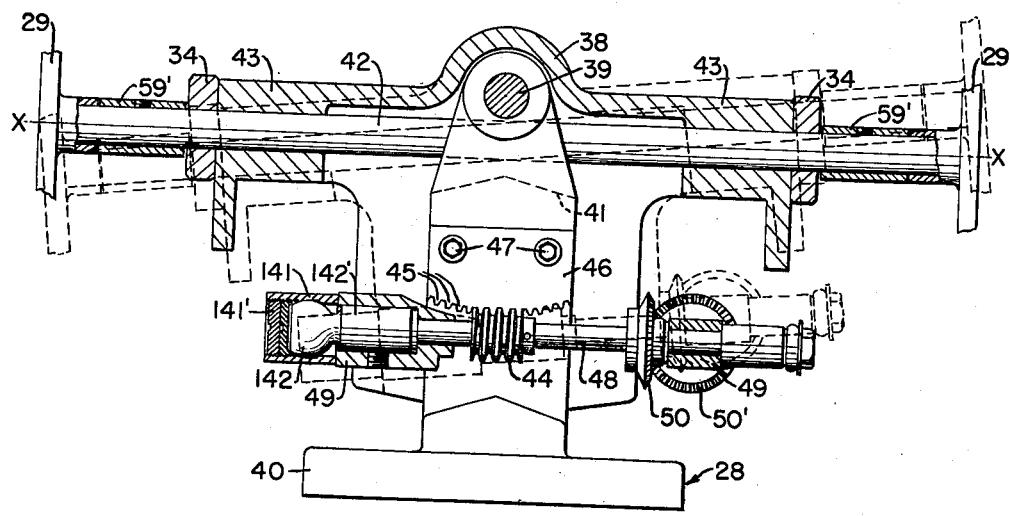
Figure 10:
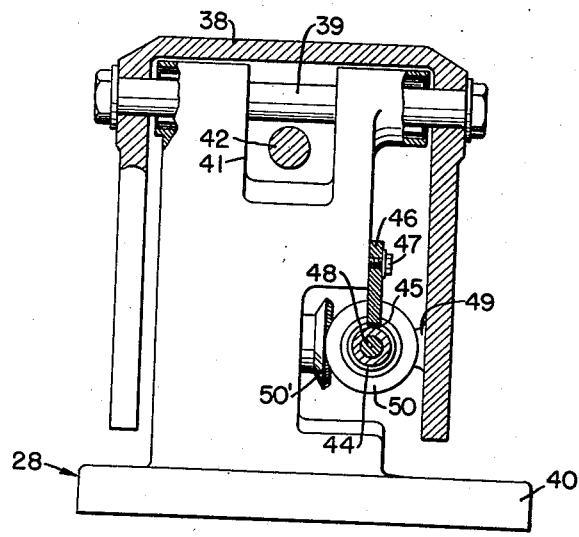
Figure 11:
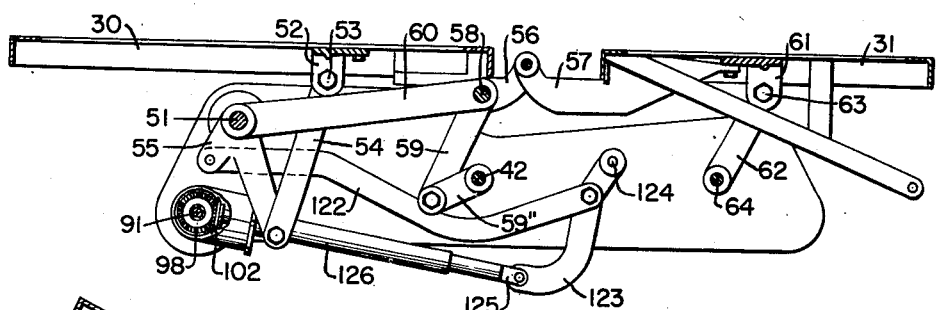
Figure 12:
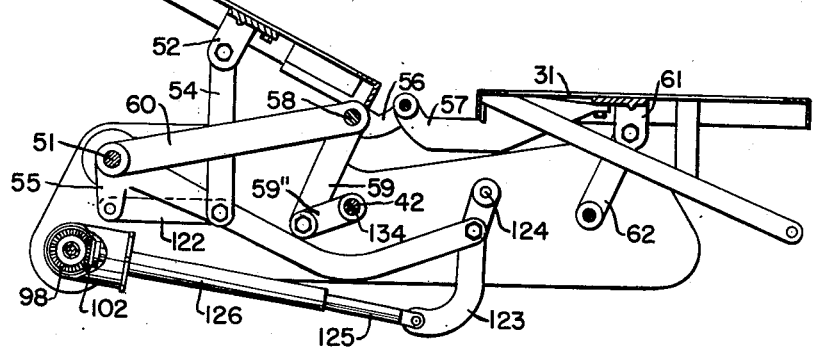
Figure 13:
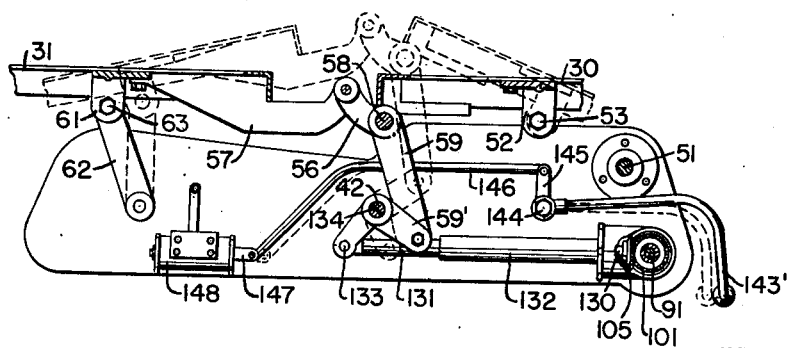

The invention and other of its objects and advantages will be better understood by referring to the following description and the accompanying drawings in which:

Fig. 1 is a side elevation of the improved operating table;

Fig. 2 is a partial side elevation of the table illustrating a reverse Trendelenburg position of the table, Fig. 3 is a longitudinal section taken along line 3—3 of Fig. 4, Fig. 4 is an end elevation partly in section, of the head end of the table and showing the operating controls, Fig. 5 is a longitudinal section taken along line 5—5 of Fig. 4, Fig. 6 is an enlarged plan view of a portion of the table with the table surface removed and showing in section the control mechanism gear transmission and some of the working parts of the table, Fig. 7 is an enlarged sectional view taken along line 7—7 of Fig. 6 showing more clearly the gear shifting cam, Fig. 8 is an enlarged sectional view taken along line 8—8 of Fig. 6, Fig. 9 is a transverse section taken along line 9—9 of Fig. 6, Fig. 10 is a side view partially in section of the yoke housing of Fig. 9, Fig. 11 is a longitudinal section taken along line 11—11 of Fig. 4 and shows the normal position of the table, Fig. 12 is the same as Fig. 11 except that the back section of the table surface is raised, Fig. 13 is a longitudinal section taken along line 13—13 of Fig. 4 and illustrates in dotted lines the "body-break" or "Mayo-kidney" position as adjusted from the normal horizontal position, and Fig. 14 is an enlarged sectional view of the double acting valve for controlling the fluid-actuated piston elements of the table.

Referring to the drawings and first to Fig. 1, 20 designates a base which constitutes the sole support upon which the table structure rests. The base 20 is rectangular in shape and has four corner supports 21 that rest on the floor under ordinary conditions. At each corner of the base is located a roller caster 22. The four casters may be raised or lowered by a foot lever 23 and when lowered the table is supported by them instead of the supports 21, thereby making the table mobile. Centrally located on the base 20 is a single cylindrical casing 24 that houses a well-known form of hydraulic jack which supports the table frame and its operating mechanism. The telescoping elements 25 and 26 maintain lateral stability of the table during extension of the jack for additional elevation of the table. The operating pistons of the jack are actuated by a foot lever 27 which forces a supply of fluid from a reservoir in the base through a fluid control valve, which will be described below, to the piston chamber when the foot lever is depressed. Repeated pumping of the lever 27 raises the table to any desired level, where it is maintained by means of the fluid control valve and a check valve device that prevents the return flow of fluid from the valve to the reservoir. By depressing lever 27 below its normal pumping stroke, the check valve is opened to allow fluid to flow back to the reservoir when the fluid control valve is operated to permit escape of fluid from the various piston chambers of the fluid operated parts of the table. By means of the fluid control valve, fluid under pressure, obtained by pumping the lever 27, may be utilized to operate other parts of the table in addition to the hydraulic jack as will be subsequently described.

Mounted on the top of the upper element 26 of the pedestal jack is a yoke assembly 28 to which the table framework is secured. This framework includes outer plates 29 on either side of the table which enclose the mechanism of the table platform supporting structure. The table surface consists of a back section 30, a seat section 31 and a leg section 32, all of which are adjustable and controlled from the head end of the table, as will be described.

Referring now to Fig. 6, the table frame is shown generally at 33 with the table top sections removed. The framework comprises the two outer plates 29, each of which is associated with a parallel frame bracket 34 on either side of the yoke assembly 28. The brackets 34 and plates 29 are provided respectively with sockets 35 and bearing blocks 36 by means of which they may be fastened together at one end and secured in this condition by suitable pins. At their opposite extremities, plates 29 and brackets 34 are secured to a cylindrical housing assembly 37 which encloses a selective driving gear transmission, as will be described below. The rigid framework thus formed is mounted on an axle 42, Fig. 9, supported in bearings 43 in the yoke assembly 28 and permitting rotation of the structure about the axis X—X, Fig. 6. Figs. 9 and 10 show the yoke assembly 28 in greater detail. The yoke itself comprises an outer hood 38 which is supported on an axle 39 held in a base portion 40 of the yoke assembly. The base portion 40 is slotted at 41 to receive the axle or shaft 42 held in the bearings 43 of the hood 38. The plates 29 and brackets 34 are rotatably secured on the shaft 42. Rotation of the framework and its supported table sections about the shaft 42 results in a Trendelenburg or reverse Trendelenburg position. The shaft 39 permits lateral tilting of the table framework and the table surface sections attached to the frame, a partially tilted position of the framework to the frame being shown by the dotted lines in Fig. 9. Such tilting of the table is accomplished by a worm gear 44 which meshes with gear teeth 45 on a plate 46 attached to base 40 by bolts 47. The worm gear 44 is secured to a shaft 48 which is supported in bearings 49 extending from the depending sides of the hood 38 and when rotated pivots the hood 38 about axle 39 because of its engagement with gear 46. The shaft 48 and worm gear 44 are rotated by means of bevel gear 50 pinned on the shaft 48 and itself rotated in turn by bevel gear 50' as will be described hereinafter.

The relationship of the table platform sections to the framework and support is shown in Figs. 3, 4, and 5. Fig. 5 shows plates 29 and brackets 34 of the table frame, to which the table sections 30 and 31 are attached by various linkages, as well as shaft 42 supported in the hood 38 of yoke 28 and upon which the frame members are mounted. The shaft 51 is supported across the table by frame members 29 at the head end of the table to further strengthen the structure and to provide an axis about which the back section linkages may pivot. The back section 30 is supported at four points. Two similar brackets, one of which is seen at 52, are secured on the under side of the back section and carry pins 53 by which they are connected to linkage arms 54. The arms 54 are pinned at their opposite ends to bell-crank levers 55 which in turn are pinned to shaft 51. Thus each of the brackets 52 is connected by pivoted linkages to shaft 51 and therefore to the table framework comprising rigid members 29 and 34. The back section 30 also carries halves 56, one of which is shown, of hinge brackets having similar halves 57 secured to the seat section 31. A pin 58 in the bracket half 56 supports one end of a link 59, a portion of which may be seen in Fig. 3. On one side of the table the link 59 is secured at its opposite end to one arm of a bell-crank 59', supported on axle 42, the bell-crank being invisible in this view, but shown in Figs. 6 and 13. On the other side of the table its opposite end is secured to arm 59", Fig. 6, extending from axle 42, both arm 59" and bell-crank 59' being so secured as to turn with axle 42. These linkages and brackets comprise the support for back section 30. Brackets 60, Fig. 3, are secured to the shaft 51 and pivot pins 58 to confine the travel of the linkage structure to predetermined paths.

The seat section 31 is supported in the central region of the table on hinge halves 57 which are pivotally linked as above described to halves 56 that depend from the back section 30. It is additionally supported by brackets 61 secured to its underneath portion and connected through pins 63 to links 62 which are in turn connected by pins 64 to the frame members 34. Pins 64 also constitute the means by which members 29 and 34 are secured together.

The leg section 32 is hinged at 65, Fig. 5, to the seat section 31 and is supported at its outermost end by an expansible linkage 66. This linkage comprises a piston element 67 which moves within a cylinder 68 that is hinged at 69 to a bracket 70 rigidly supported by seat section 31. The cylinder is supplied with operating fluid by flexible conduit 71. By suitable operation of expansible linkage 66, the leg section may be moved through a broad range of angular positions with respect to the seat section depending primarily upon the limits imposed by the operating range of the hydraulically operated linkage mechanism 66. Two positions of the leg section are shown in Fig. 5, one in dotted lines and one in solid lines. Fluid is supplied under pressure to the operating cylinder 68 from the above-mentioned fluid control valve, as a result of the operation of foot lever 27, Fig. 1. While the leg section is raised by fluid under pressure, it is lowered by the force of gravity when the fluid pressure is released.

The midsection of the operating table has a retractable element, referred to as a "kidney-bridge," which may be raised to elevate the patient's abdominal region when this is desired. The kidney bridge comprises a plate 73, Fig. 5, slightly curved and extending across the full width of the table, and supported at both sides of the table on gear racks 74, which are slidably retained in housings 75. Teeth 76 on the racks 74 mesh with gears 77 in the housings 75 to actuate the kidney bridge when the gears are rotated. The gears 77 are driven from a shaft 78 through gears 79 and intermediate gears 80. The housings 75 are supported by the shaft 78 which is journalled in the side brackets 57 of the seat section 31 and by cantilever arms 82 extending from the housings 75 and sliding in collars 83 pivoted on the pins 58. The shaft 78 is driven as shown in Fig. 3 by means of an extension rod 84 which extends to an operating handle 85 at the head end of the table. The rod 84 has an extension through a universal joint which carries a worm gear 86 which rotates the shaft 78 through a worm wheel 87.

The operating table, the principal structural elements of which have now been described, is adapted to assume four major positions in addition to the flat horizontal; namely, Trendelenburg and reverse Trendelenburg, Mayo-kidney, chair, and lateral tilt. These four names describe the four general table positions used in varying degrees for certain operations. The Trendelenburg and reverse Trendelenburg positions occur when the table frame is tilted about the axis of the shaft 42. In the Trendelenburg position the head end of the table is lowered, and in the reverse Trendelenburg the head end is raised as shown in Fig. 2. The Mayo-kidney position is also referred to as the "body-break" and is effected by raising the middle of the table sections as seen in Fig. 13. The kidney bridge is generally used in this position. The chair position is much as the name implies and is achieved by raising the back section 30 until it acts as the back support of a chair of which the seat section 31 forms the seat. In this position the leg section 32 is usually dropped to near-vertical position. "Lateral tilt" refers to the rotation of the table frame laterally about the axle 39 of yoke 28, Fig. 9. The Trendelenburg positions and the lateral tilt are the basic table movements achieved by rotation of the table frame about the yoke assembly 28, while the other table movements occur with respect to the frame and may be made with the table in either the Trendelenburg or lateral tilt positions, or both. The means by which the various table elements and the frame are so moved is the principal feature of this invention and will now be described.

Referring once again to Fig. 1, the main table elements are actuated by means of a handwheel (or crank) 88 which is located with the other table control elements at the head end of the table. The operating mechanism is shown in Fig. 6. The handwheel 88 is journaled at its hub 89 in a bearing 90 at the end of the tubular housing 37. A drive-shaft 91 disposed axially within the tubular housing 37 is driven by the handwheel 88 through a pin 92 held in the hub 89 and received in a slot 93 in the end of shaft 91. Bearings 94 and 95 support the shaft 91 in the housing 37.

A sleeve 96 is linked to the shaft 91 by means of a pin and slot connection 97 which causes the sleeve to rotate with the shaft and yet permits relative longitudinal displacement of the two. Gears 98 and 99 are pinned directly to the shaft 91, while gears 100 and 101 are carried by and pinned to sleeve 96. Each of these gears respectively drives one of gears 102, 103, 104 and 105 when shifted by movement of shaft 91 or sleeve 96 to make the proper selected engagement. A spring 106 disposed on shaft 91 is compressed between collar 107, carried by the shaft, and the sleeve 96 to afford opposite axial forces on the shaft and the sleeve. The slot 93 enables the shaft 91 to move axially so that both the sleeve 96 and the shaft 91 are movable with respect to one another and with respect to the tubular housing 37.

One end of the sleeve 96 has an enlarged portion 108 which has a hardened bearing surface 109. A similar enlargement 110 is provided at an adjacent position on the shaft 91 and has a bearing surface 111. The faces 109 and 111 are separated from one another against the force of the spring 106 by means of a cam element 112 pinned to a shaft 113 which extends at right angles to the shaft 91. The shaft 113 is journaled in a bearing 114 mounted in a boss 115 protruding outwardly from the housing 37. A knob, or handle, 116 receives the outer end of the shaft 113 which has a washer 117 that retains a coil spring 118 on the shaft and compresses it against a shoulder 119 of the knob and urges the knob against the face of the bearing 114. A pin 120 through the shaft 113 is received in a square bushing in the knob 116 to cause the shaft 113 and knob 116 to rotate together and yet permit relative axial movement of the knob. A pin 120' is secured in the forward portion of the knob 116 and is adapted to engage a radial slot 121 in the bearing 114 to lock the shaft and the knob in position. A number of such slots or grooves 121, as seen in Fig. 8, are formed in the face of the bearing 114 to lock the shaft 113, and therefore the cam, in a number of angular positions. To rotate the shaft to different angular positions the knob 116 is pulled outwardly against the compression of the spring 118 to retract the pin 120' from the slot 121. The spring 118 affords a positive engagement of the pin 120' and slot 121 and acts as a locking device when the knob is rotated to certain different angular positions.

The driving gears 98, 99, 100 and 101 are placed in engagement with the respective mating gears, selectively, by operation of the cam element 112, through manipulation of the knob 116. With the cam positioned as shown in Figs. 6 and 7, the sleeve 96 is in its rightmost location as viewed in Fig. 7 and the gear 101 is in engagement with the gear 105. The gears are positively engaged by the compressive force of spring 106. Rotation of the gear 105 is obtained through the meshing gear 101, sleeve 96 and shaft 91, from the handwheel 88 operatively connected to the shaft 91 by means of the pin 92. Each of the paired gears may be similarly engaged and positively driven when placed in meshing relation by rotation of the cam element 112 which is so formed that only one pair of gears is in engagement at one time.

The operation of the cam element 112 and its effect on the gear-supporting shaft and sleeve may be understood by referring to Fig. 7. The bearing faces 109 and 111 of the sleeve 96 and the shaft 91, respectively, are positively urged toward one another on opposite sides of the cam 112 by the spring 106, Fig. 6. Upon rotation of the cam from its position shown in Fig. 7 the bearing faces 109 and 111 are forced outwardly from it, thereby axially moving sleeve 96 and shaft 91 against the force of the spring 106. During a complete rotation of the cam, the gears 98, 99, 100 and 101 will be caused to selectively engage their corresponding gears 102, 103, 104 and 105. For example, when the cam is rotated counterclockwise from the position shown to the position represented by the dotted lines, the sleeve 96 will be moved away from the cam against the force of the spring to disengage gears 101 and 105 and the shaft 91 will be moved in the opposite direction to cause engagement of gears 99 and 103. Because there are but four sets of gears to be selectively engaged, the cam is shaped to cause engagement of a different set upon each quarter turn.

The manner in which driving power is transmitted, selectively, to the several driving gears of the table sections having now been made clear, the linkages by which this motion is transmitted to the table elements will now be described. The supporting linkages for the table sections 30 and 31 and means for transmitting motion to the back section 30 are shown in Figs. 11 and 12. The bell-crank 55, linked to the arm 54 which affords support to the head end of the section 30, is linked to an arm 122 which is pivotally linked at its other end to a lever 123, fulcrumed at 124 on the table frame member 29. A yoke 125 engages the lever 123 and rotates the lever in response to the displacement of an extensible link 126 operated by the gear 102 through gear 98 and drive shaft 91. The link 126 is shown in greater detail in Fig. 6. It comprises a centrally threaded shaft 127, a tubular member 128 having a threaded collar portion and carrying the yoke 125 at its outer end, and an outer shield element 129 which encloses the movable elements. The shaft 127 carries the gear 102 and moves the various linkages, above referred to, when it is rotated. In Fig. 12 the same linkages are shown in an altered position to indicate their respective arrangement with the operating table approaching a "chair position." In this position the section 30 is rotated about the pin connections 58 which are held stationary by the links 59 that are hinged to levers 59', 59'' keyed to the axle 42. This position is obtained by adjusting the knob 116, Fig. 6, to engage the gears 98 and 102 and rotating the handwheel 88 to transmit the motivating power to the linkages as described. When the section 30 has been elevated to any desired level it will remain locked in this position because of the friction between the threaded shaft 127 and tubular element 128.

The Mayo-kidney, or "body-break," position is obtained by engaging the gears 101 and 105, Figs. 6 and 13, which transmit power to a threaded shaft 130. An elongated collar 131 rides on the shaft 130 within a tubular shield 132 and rotates the bell-crank lever 59' through a pin connection 133. As shown in Fig. 13, rotation of the bell-crank 59' rotates the axle 42 to which the crank is secured by a pin 134 so that both crank 59' and arm 59'' (Figs. 11 and 12) one at each side of the framework, pivot and raise the arms 59 and pins 58. The center of the table is thereby elevated in the manner shown by the dotted lines in Fig. 13. The section 31 tilts upwardly with the section 30 because of the hinged connection of the members 56 and 57, each section pivoting respectively on pins 63 and 53.

Lateral tilt of the table is obtained by turning the adjusting knob 116, Fig. 6, to permit engagement of the gears 99 and 103. The gear 103 drives a shaft 135. A tubular sleeve 136 is carried by the shaft 135 and is driven by it through the agency of a pin 137 extending from the shaft and protruding into a longitudinally extending slot 138 in the sleeve. Free selective motion between the sleeve and shaft in a longitudinal direction is permitted by such connection. The sleeve 136 is journaled in a housing 139, Fig. 6, on the base portion of the yoke 28 and carries a bevel gear 50', Fig. 9. As seen in this figure the shaft 48 is rotated through engagement of its gear 50 with the gear 50' and the worm gear 44 is thereby moved along the gear teeth 45 on the plate 46. Movement of the shaft 48 thereby causes the hood 28 to rotate about the axle 39 and tilt the table laterally. Such a displaced angular position of the table is illustrated by the dotted lines in this figure. A reverse tilt is obtained by opposite rotation of the operating handwheel 88, Fig. 6.

Trendelenburg and reverse Trendelenburg positioning of the table are accomplished by rotation of the table frame about the axle 42. In Fig. 2 the table is shown in reverse Trendelenburg position. These positions of the table may be accomplished by elongation of a telescoping linkage 140, Figs. 2 and 6, the inner element 141 of which is attached to yoke 28 through a ball and socket joint, as shown at 142 in Figs. 2 and 9. As seen in Fig. 9, the joint comprises a shaft 142' having a ball section on one end, the shaft being supported in bearing 49 which also supports worm shaft 48. Inner element 141 of telescoping linkage 140 pivots about the ball and is maintained thereon by threaded cap 141'. The joint 142 may, of course, comprise a simple pin connection since the members meeting in this joint move in only one plane, Referring again to Fig. 6, the housing 140 encloses a threaded shaft 143 which is engaged by the tubular sleeve element 141 of the linkage. Shaft 143 carries gear 104 which is operated when placed in engagement with gear 100 on sleeve 96 by appropriate setting of the knob 116 as already described. By rotating handwheel 88, collar 141 is moved along the shaft 143, thereby shortening or lengthening, depending upon the direction of rotation of the handwheel, the linkage 140 causing the table frame to rotate about the axle 42. By lengthening the linkage, as shown in Fig. 2, reverse Trendelenburg positioning of the table is accomplished. When the linkage is shortened by opposite rotation of the handwheel 88, the table is placed in Trendelenburg position. The table will remain fixed in any degree of either position, until further manipulation of the associated linkages, because of the friction of the drive mechanism.

The four above-described linkages provide for longitudinal stability of the table in addition to that provided by frame members 29 and 34.

It will be evident that of the four major positions of the table, two or more may occur at the same time. With the table sections adjusted to a chair position, for instance, the frame may be tilted about its transverse axis to a Trendelenburg position. Any arrangement of the table sections may be superimposed upon the angular positioning of the table frame both laterally and longitudinally in order to obtain the desired position.

The fluid actuated members of the table operating parts are controlled by handle 143', Fig. 13, which may be depressed or raised by rotation about a pin 144. A right angle extension 145 is linked to a rod 146 which in turn is attached to a yoke or stem 147 of a fluid control valve 148 that regulates the flow of fluid from the aforementioned pump operated by the foot lever 27 of Fig. 1.

Referring to Fig. 14, the fluid control valve 148 may be seen in section. The valve comprises a cylindrical hollow body 149 having two fluid chambers 150 and 151 separated by a partition 152 through which a passage 153 extends placing the two chambers in communication. The outer ends of the chambers 150 and 151 are closed respectively by plugs 154 and 155 that thread into the valve body compressing sealing gaskets 156 between them and the body to form a fluid tight seal. Fluid from the above-mentioned pump is introduced into the passage 153 through an inlet 157 and the conduit 157', the ends of the passage being normally closed by valves 158 and 159 that engage valve seats 160 and 161 respectively. The valves are carried on a central valve stem 162 that extends through the valve body and is threaded at one end into a block 163 and at its other end into the valve stem yoke 147. The yoke 147 and block 163 carry annular rubber ring gaskets 164 and slide axially through end blocks 154 and 155. Similar rings or gaskets 165 are mounted on the stem 162 to permit the stem to move through valve seats 158 and 159 without permitting leakage of fluid past these members. The valves 158 and 159 are held against the valve seats 160 and 161 by coil springs 166 and 167 respectively, the springs being compressed by the end blocks 154 and 155. The valves may be opened against the force of springs 166 and 167 by being engaged by an enlarged portion 168 of the valve stem 162 which forces one of the valves open depending upon the direction in which the valve stem is moved by the control handle 143' before-mentioned. The chamber 151 discharges fluid through outlet 170 which is connected by conduit 71 with a hydraulic cylinder 68 of the leg section 32 of the table. Fluid for the table pedestal cylinder is discharged from the chamber 150 through an outlet 169 and conduit 169'.

It will thus be seen that the fluid pressure for operation of either the table pedestal or the table leg section is created by operation of the foot pump 27, Fig. 1, and that fluid under pressure is directed to either the pedestal or table leg section by adjustment of the fluid control valve by handle 143'. The fluid actuated elements remain fixed in the positions to which they are moved because when the valve handle is released, the valve stem no longer exerts any pressure upon the valves and the valve springs plus the back pressure on the downstream side of the valves serve to effectively seat the valves, thereby preventing a backward flow of fluid through the valve. Both the table pedestal and the leg section of the table surface are lowered independently by positively opening their corresponding valves by actuation of the valve stem in the proper direction, thereby allowing fluid to flow backwardly through the valve toward the reservoir. To permit this, of course, the foot pump 27 must first be depressed beyond its normal stroke to open a check valve in the line between the fluid control valve and the reservoir. Provision is also made to take care of the possibility of the foot pump being operated without the fluid control valve having been first properly set. This comprises having coil spring 167 heavier than coil spring 166 so that valve 158 controlling the flow of fluid to the pedestal will open under less pressure than will valve 159 which controls the flow of fluid to the leg section of the table surface. Thus, in the event the foot pump is operated without adjusting the fluid control valve the positioning of the leg section will not be affected as the fluid will pass through valve 158 to the pedestal and will raise the table only. The valve operating handle 143' must, however, be held in the proper selective position to lower the table and to raise or lower the leg section.

Because of the construction of the fluid control valve no relief valve on the pump side of the control valve is necessary and little more than the pressure imposed by the usual load on the pedestal or leg section of the table surface will prevail in the fluid system. The valve is especially valuable because it permits rapid operation of those parts of the table which it controls and such rapid operation is in many cases essential. For example, if when in use, a Trendelenburg position has to be quickly obtained and yet the patient supported on the table is not held thereon by straps or other suitable restraining means, the leg section of the table must be quickly dropped so that the bent portion of the patient's legs affords suitable resistance to his sliding off the table. The requirement for rapid adjustment of the table during an operation being often urgent, the facility with which the various fluid operated members may be adjusted by means of the control valve make the kind of valve described particularly useful in the table mechanism.

Fig. 4 shows the relative positioning of the control elements. It will be observed that handwheel 88 and control knob 116 for movement of the table into its four major positions, crank 85 for operation of the kidney-bridge, and handle 143' for control of the fluid valve are all located compactly within a small area and within easy reach at the right hand head end of the table. Heretofore it has been necessary because of the complexity of the table structure and its operating mechanism to arrange such controls at various points on the table determined more by structural limitations than by convenience of operation.

The operating table above described may be modified in various particulars, but it is intended that such modifications be within the scope of this invention if they fall within the scope of the appended claims.

We claim:

1. In a surgical operating table comprising a patient supporting back section and seat section, and a supporting structure having linkage mechanisms for supporting and changing the relative positions of said sections, each of the linkage mechanisms including an operating gear, the improvement which comprises a single selective gear transmission means for selectively operating said linkage mechanisms, said selective gear transmission means comprising a shaft having mounted thereon at least one gear, a sleeve member mounted on said shaft coaxial therewith and having mounted on it at least one gear, said sleeve and said shaft being connected together by a splined connection, means mounted on said shaft for urging said shaft and sleeve in opposite axial directions, means for rotating said shaft and sleeve in unison, and cam means operable to move said shaft and sleeve relative to one another to place one of said gears carried by said shaft and sleeve in operative engagement with one of said operating gears.

2. A surgical operating table which comprises a patient-supporting back section and a patient-supporting seat section, a supporting structure mounted for varied spacial positioning, said supporting structure including linkage mechanisms for supporting and changing the relative positions of said sections, tilting mechanisms operatively connected to the supporting structure for angularly changing the spacial position of said supporting structure about both its lateral and longitudinal axes, each linkage mechanism and each tilting means including an operating gear, a single selective gear transmission means for selectively operating said linkage mechanisms and said tilting mechanisms, and cam means for adjusting the selective gear transmission means, said selective gear transmission means comprising a shaft having mounted thereon at least one gear, a sleeve member mounted on said shaft coaxially therewith and having mounted on it at least one gear, said sleeve member being connected to said shaft by a splined connection, means mounted on said shaft for urging said shaft and sleeve in opposite axial directions, and means for rotating said shaft and said sleeve in unison, and said cam means being operable to move said shaft and sleeve relative to one another to place one of said gears carried by said shaft and sleeve in operative engagement with one of said operating gears of said linkage mechanisms and said tilting mechanisms for selective operation of said linkage mechanisms and tilting mechanisms.

3. In a surgical operating table including a patient-supporting table surface consisting of a back section, a seat section and a leg section, a supporting structure having a plurality of linkage mechanisms for supporting the table sections in various relative positions, a pedestal for supporting said supporting structure, means for operating the table sections, means for laterally tilting the supporting structure with respect to the pedestal, and means for longitudinally tilting the supporting structure with respect to the pedestal, the improvement which comprises a single selective gear transmission means for selectively operating the linkage mechanisms for the back and seat sections and both of the tilting means, and cam means for adjusting the selective gear transmission means for selective operation of said linkage mechanisms and both of said tilting means, each linkage mechanism and each tilting means including an operating gear, and said selective gear transmission means comprising a shaft having mounted thereon at least one gear, a sleeve member mounted on said shaft coaxial therewith and having mounted on it at least one gear, said sleeve and said shaft being connected by a splined connection, means mounted on said shaft for urging said shaft and sleeve in opposite axial directions, and means for rotating said shaft and sleeve in unison, the cam means being operable to move said shaft and sleeve relative to one another to place one of said gears carried by said shaft and sleeve in operative engagement with one of said operating gears.

4. A surgical operating table which comprises a patient-supporting back section and a patient-supporting seat section, a supporting structure mounted for varied spacial positioning, said supporting structure including linkage mechanisms for supporting and changing the relative positions of said sections, tilting mechanisms operatively connected to the supporting structure for angularly changing the spacial position of said supporting structure about both its lateral and longitudinal axes, each linkage mechanism and each tilting mechanism including an operating gear, each linkage mechanism and each tilting mechanism further extending in a direction substantially longitudinally of the table and each being longitudinally expandable, a single selective gear transmission means for selectively operating said linkage mechanisms and said tilting mechanisms, and cam means for adjusting the selective gear transmission means, said selective gear transmission means comprising a housing extending substantially transversely of the table with the operating gears for said linkage mechanisms and for said tilting mechanisms being located therein, a plurality of driving gears mounted within said housing one for each of the operating gears for said linkage mechanisms and tilting mechanisms, and a drive shaft mounted within said housing for driving said driving gears and through them selectively the operating gears of said linkage mechanisms and tilting mechanisms, said cam means being adapted to select which of said operating gears is to be driven by said drive shaft and said driving gears.

References Cited in the file of this patent

UNITED STATES PATENTS

| Number | Name | Date |
|---|---|---|
| 743,508 | Hornung, Jr. | Nov. 10, 1903 |
| 926,579 | Laughlin | June 29, 1909 |
| 989,373 | Lindgren | Apr. 11, 1911 |
| 1,255,322 | Laraia | Feb. 5, 1918 |
| 1,464,286 | Lundbland | Aug. 7, 1923 |
| 1,486,304 | Ross | Mar. 11, 1924 |
| 1,571,205 | Laurent | Feb. 2, 1926 |
| 1,650,327 | Conrad | Nov. 27, 1927 |
| 1,749,867 | Allison | Mar. 11, 1930 |
| 1,814,482 | Miller | July 14, 1931 |
| 1,946,899 | Clachko | Feb. 13, 1934 |
| 2,037,888 | De Quervain | Apr. 21, 1936 |
| 2,092,266 | Talas | Sept. 7, 1937 |
| 2,172,941 | Manning et al. | Sept. 12, 1939 |
| 2,186,660 | Alepaeus | Jan. 9, 1940 |
| 2,217,783 | Bell | Oct. 15, 1940 |
| 2,242,057 | Czrellitzer | Mar. 13, 1941 |
| 2,329,407 | Meyer | Sept. 14, 1943 |
| 2,416,410 | Shampaine | Feb. 25, 1947 |
| 2,501,415 | Shampaine | Mar. 21, 1950 |
| 2,520,455 | Clachko | Aug. 29, 1950 |